(12) United States Patent  (10) Patent No.: US 6,186,165 B1
Damiani  (45) Date of Patent: Feb. 13, 2001

(54) HOT WATER DELIVERY DEVICE FOR APPLICATION TO TRUCKS, TRACTOR-TRAILER VEHICLES AND THE LIKE

(76) Inventor: Pasquale Damiani, Vicolo Lazzaretto, 23/D, 26020, Cremona (IT)

(*) Notice: Under 35 U.S.C. 154(b), the term of this patent shall be extended for 0 days.

(21) Appl. No.: 09/530,117
(22) PCT Filed: Nov. 2, 1998
(86) PCT No.: PCT/IT98/00307
§ 371 Date: Apr. 24, 2000
§ 102(e) Date: Apr. 24, 2000
(87) PCT Pub. No.: WO99/22965
PCT Pub. Date: May 14, 1999

(30) Foreign Application Priority Data

Nov. 4, 1997 (IT) .............................................. MI97U0786

(51) Int. Cl.$^7$ .................................................... E01H 1/10
(52) U.S. Cl. ......................... 137/351; 137/350; 137/334; 222/146.2; 219/202

(58) Field of Search .................................... 137/350, 351, 137/334; 222/146.2; 219/202

(56) References Cited

U.S. PATENT DOCUMENTS

| | | | |
|---|---|---|---|
| 3,669,314 | * | 6/1972 | Goings .................................. 222/136 |
| 4,055,279 | * | 10/1977 | Lapera et al. .......................... 222/54 |
| 4,140,150 | * | 2/1979 | Rundell ................................. 137/351 |
| 4,771,822 | * | 9/1988 | Barbosa ................................. 165/41 |
| 5,497,918 | * | 3/1996 | Brilanchik ............................. 137/351 |

* cited by examiner

*Primary Examiner*—A. Michael Chambers
*Assistant Examiner*—Thomas L. McShane

(57) ABSTRACT

The invention relates to a hot water delivery device (20), for application to trucks, tractor-trailer vehicles and the like, including a water tank (1) which can be housed in a casing (10) rigid with the platform of the vehicle The main feature of the invention is that the device further comprises an electric power supplied boiler (6), having a size adapted to allow the boiler to be housed in said casing.

7 Claims, 2 Drawing Sheets

HOT WATER DELIVERY DEVICE FOR APPLICATION TO TRUCKS, TRACTOR-TRAILER VEHICLES AND THE LIKE

BACKGROUND OF THE INVENTION

The present invention relates to a hot water delivery device for application to trucks, tractor5 trailer vehicles and the like.

As is known, truck and tractor-trailer drivers usually drives their vehicles through long distances in performing their product transportation jobs.

Thus, it would be advantageously for the driver to have available hot water for example for hand washing purposes, as required after servicing operations to the vehicle or in parking places or the like.

The availability of hot water would be very advantageous, in particular, in winter and night periods.

In fact, frequently a truck driver, as one of the above mentioned events occurs, cannot easily access hot water delivery stations on roads or highways; moreover, prior trucks or tractor-trailers do not include heating means for heating a possibly transported water amount.

Thus, as stated, it would be very advantageous to provide a hot water delivery device, to be easily applied to the above vehicles, and which allows to overcome or greatly reduce the above mentioned problems.

SUMMARY OF THE INVENTION

Accordingly, the aim of the present invention is to provide such a hot water delivery device allowing the drivers of the above mentioned vehicles to have available a suitable hot water amount for meeting all of their contingent requirements.

Within the scope of the above mentioned aim, a main object of the present invention is to provide such a hot water delivery device, for application to trucks and the like, which can be used even in particularly rigid environmental conditions.

According to the present invention, the above mentioned aim and object, as well as yet other objects, which will become more apparent hereinafter, are achieved by a device for delivering hot water, for application to trucks, tractor-trailer vehicles and the like, according to claim 1.

According to a preferred embodiment of the invention, said heating means comprise a water boiler.

The boilers herein preferably used are electrically supplied, and have a comparatively small size, to be easily transported.

In particular, by way of a not limitative example, for a water tank holding 20 liters of water, it would be possible to use a boiler power supplied at 24 V, and having an electric power of 400 Watts.

In order to adjust the delivered water temperature, according to the user requirements, a mixing faucet is arranged between the water tank and boiler.

In said casing holding said device according to the invention, it is also possible to provide an electric resistance, for preventing water in said tank from freezing, in a case of a comparatively low outer temperature.

BRIEF DESCRIPTION OF THE DRAWINGS

Further characteristics and advantages of the present invention will become more apparent hereinafter from the following detailed disclosure, given by way of an illustrative but not limitative example, with reference to the accompanying drawings, where.

DESCRIPTION OF THE PREFERRED EMBODIMENT

Figure 1:
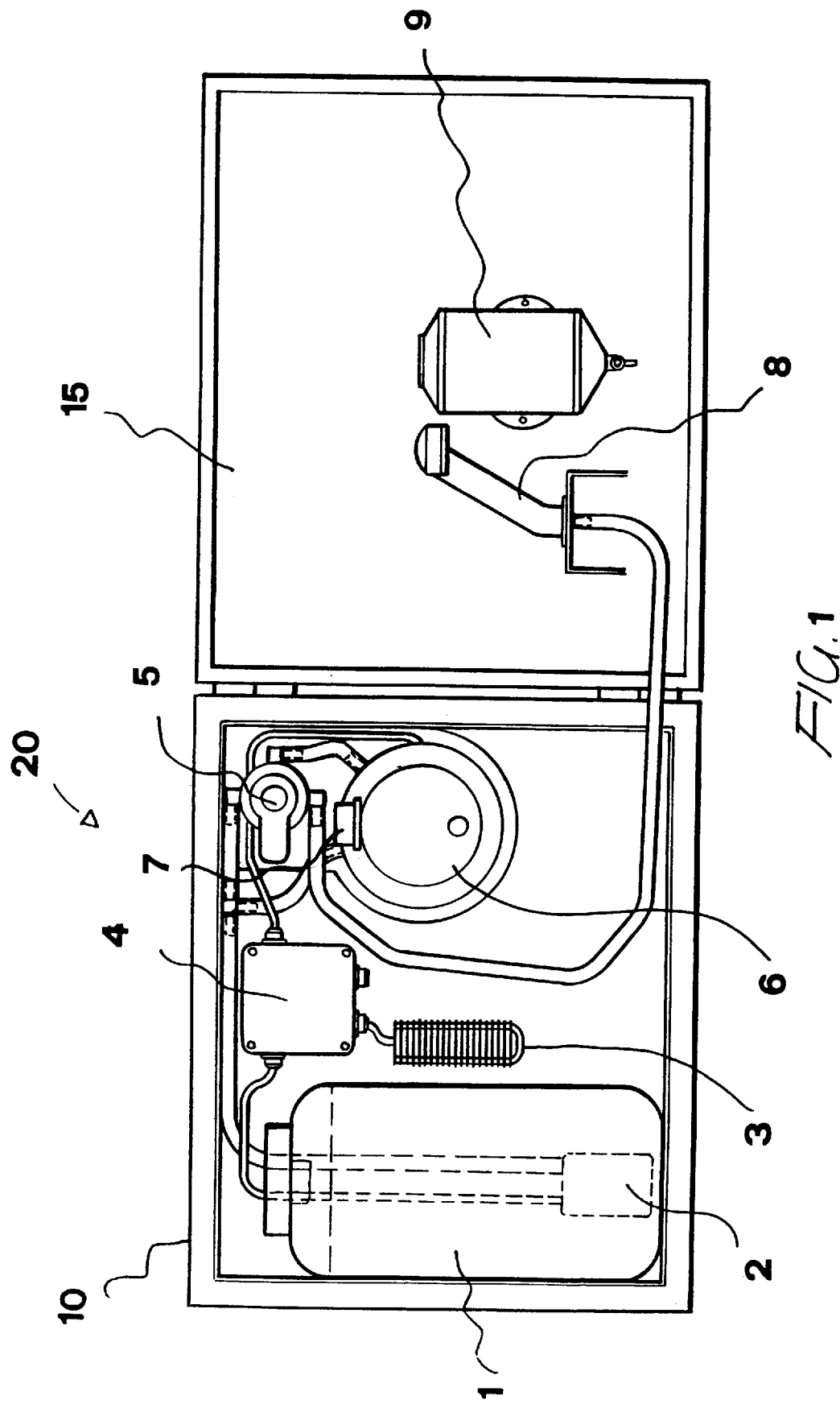
FIG. 1 is a front view of the hot water delivery device for application to trucks and the like, according to the invention.
Figure 2:
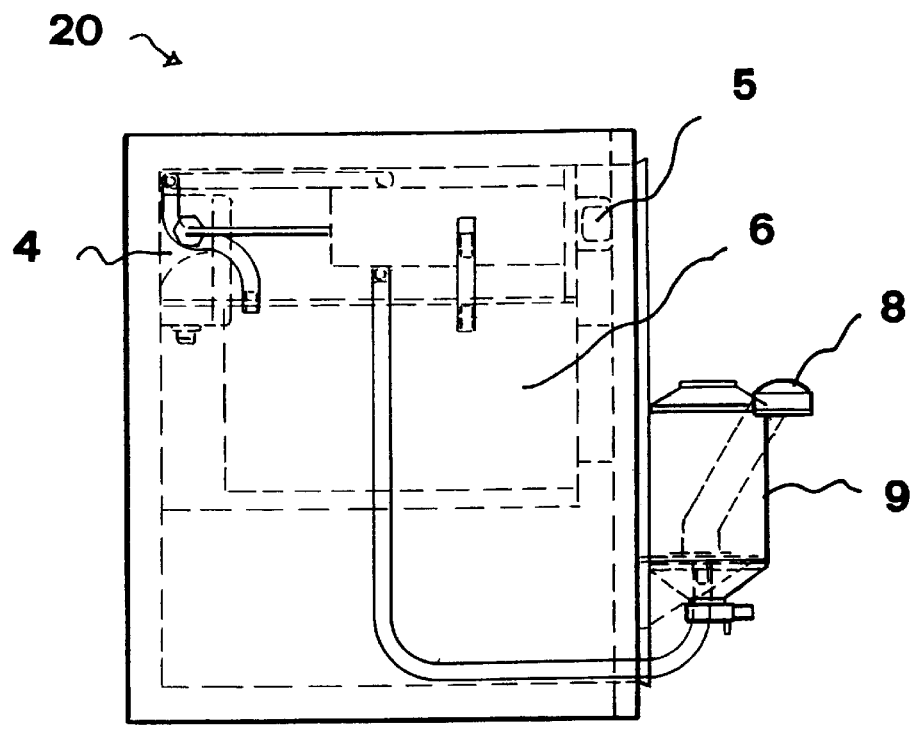
FIG. 2 is a side view of the device according to the invention.
Figure 3:
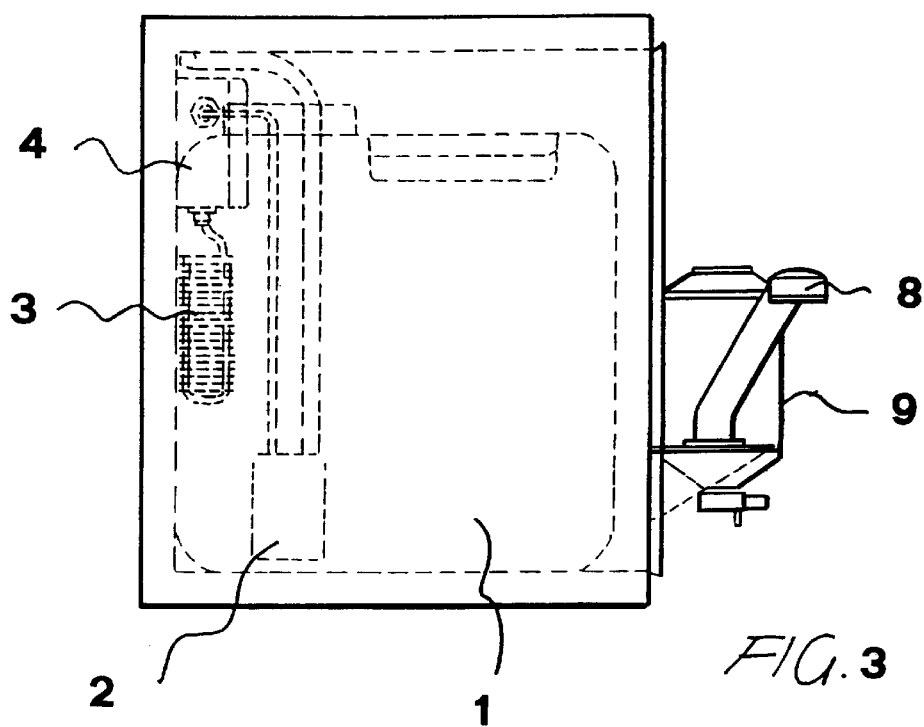
FIG. 3 is a further side view of the device according to the invention, in which is furthermore shown an anti-freezing electric resistance.

In the following disclosure, reference will be made to a preferred embodiment of the invention, which is illustrated, by way of a not limitative example of a lot of possible variations of the invention.

The hot water delivery device, for application to trucks and the like vehicles, according to the present invention, and which has been generally indicated by the reference number 20, can be housed inside a casing 10, rigid with the vehicle, and being preferably applied under the vehicle platform.

In said casing 10, a tank 1 holding therein water to be heated and controllably supplied is arranged.

The water held in said water tank 1 is supplied from said water tank to a boiler 6, electrically power-supplied, by a submersed pump 2.

The boiler 6 is preferably provided with a thermostat or temperature switch 7 for adjusting the operating temperature thereof.

The water is supplied to a water delivery element 8, which can be actuated by the user, depending on the requirements.

The delivered water temperature can be adjusted by a water mixing faucet 5, arranged between the water tank 1 and boiler 6, depending on the user requirements.

The device according to the invention further comprises an electric resistance 3, for preventing water held in said water tank 1 from freezing.

In order to rationally arranging the electric wirings affecting the submersed pump 2, electric resistance 3 and boiler 6, a junction box 4 for said electric connections, is also arranged in said casing 10.

Preferably, the device according to the invention comprises moreover a soap metering assembly 9, suitably arranged on the door 15, to be easily accessed by the user.

In particular, and by way of an indicative example, for a water tank 1 holding therein 20 liters of water, it would be possible to use a boiler 6 supplied at 24 V and having an electric power of 400 Watts.

However, it should be apparent that it would be also possible to use a gas-fired boiler, alternately to an electrically powered boiler.

Thus, owing to the provision of the above disclosed device, the driver and possible passengers of a truck will have available a sufficient hot water amount, for personal use, to meet any requirements.

In fact, for accessing the hot water delivery device, it will be sufficient, upon stopping the vehicle, to open the door 15 of the casing 10 and operate the mixing faucet 5 in order to deliver hot water having a set desired temperature, said hot water being conveyed to the parts to be washed by the hot water delivery assembly 8.

Moreover, it is also possible to easily use the soap as supplied by the soap metering assembly 9.

In this connection it should be pointed out that the water tank 1 can be easily water re-supplied in order to recover the water amount therein.

What is claimed is:

1. A hot water delivery device (20), for application to trucks, tractor-trailers and the like vehicles, including a water tank (1) holding herein water to be heated, water heating means (6) for heating water supplied from said water tank (1) by an electrically power supplied submersed pump (2) held in said water tank (1), temperature adjusting means (5) for adjusting a temperature of the delivered water, characterized in that said water tank (1), water heating means (6) and temperature adjusting means (5) are arranged in a casing (10) rigidly coupled with a platform of said vehicle, said casing (10) having an openable door (15), that said temperature adjusting means (5) comprise a manually adjustable mixing faucet (5) arranged between said water tank (1) and water heating means (6) and accessible for an user through said door (15) of said casing (10), that electric resistance means (3) are moreover provided for preventing water in said water tank (1) from freezing, and that in said casing (1), a junction box (4) is moreover included for providing an ordered electrical connection means for said water heating means (6), electric resistance means (3) and submersed pump (2).

2. A hot water delivery device, according to claim 1, characterized in that said device comprises a soap metering assembly (9) coupled to said door (15) of said casing.

3. A hot water delivery device, according to claim 1, characterized in that water heating means comprise an electric power supplied boiler.

4. A hot water delivery device, for application to trucks, tractor-trailers and the like vehicles according to claim 1, characterized in that said delivered water temperature adjusting means comprise a mixing faucet, arranged between said water tank and boiler.

5. A hot water delivery device, for application to trucks, tractor-trailers and the like vehicles according to claim 1, characterized in that said water tank includes an electrically power supplied submersed pump for delivery water to said boiler.

6. A hot water delivery device, for application to trucks, tractor-trailers and the like vehicles according to claim 1, characterized in that said device further comprises an electric resistance for preventing water in said water tank from freezing.

7. A hot water delivery device, for application to trucks, tractor-trailers and the like vehicles according to claim 1, characterized in that said device further comprises a soap metering assembly.

\* \* \* \* \*